(12) United States Patent
Tujkovic et al.

(10) Patent No.: US 8,989,695 B2
(45) Date of Patent: Mar. 24, 2015

(54) WIRELESS COMMUNICATION DEVICE AND METHOD FOR TRANSMITTING EMERGENCY DATA FROM OUTSIDE A COVERAGE ZONE

(75) Inventors: Djordje Tujkovic, Santa Clara, CA (US); Erik Stauffer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 95 days.

(21) Appl. No.: 13/250,665

(22) Filed: Sep. 30, 2011

(65) Prior Publication Data

US 2013/0052985 A1 Feb. 28, 2013

Related U.S. Application Data

(60) Provisional application No. 61/527,301, filed on Aug. 25, 2011.

(51) Int. Cl.
| | | |
|---|---|---|
| H04M 11/04 | (2006.01) | |
| H04W 4/22 | (2009.01) | |
| H04L 1/08 | (2006.01) | |
| H04L 1/00 | (2006.01) | |
| H04W 76/00 | (2009.01) | |

(52) U.S. Cl.
CPC . *H04W 4/22* (2013.01); *H04L 1/08* (2013.01); *H04L 1/0015* (2013.01); *H04W 76/007* (2013.01)
USPC ............. 455/404.1; 455/404.2; 455/456.3; 455/456.1

(58) Field of Classification Search
CPC .............................. H04W 4/22; H04W 76/007
USPC ............. 455/404.1, 404.2, 456.3, 456.1
See application file for complete search history.

(56) References Cited

U.S. PATENT DOCUMENTS

| | | | |
|---|---|---|---|
| 2003/0144042 A1* | 7/2003 | Weinfield et al. | 455/574 |
| 2004/0198312 A1* | 10/2004 | Jarett | 455/404.1 |
| 2007/0087689 A1* | 4/2007 | Alles et al. | 455/11.1 |
| 2008/0261556 A1* | 10/2008 | McLellan | 455/404.2 |
| 2009/0061865 A1* | 3/2009 | Majumdar et al. | 455/434 |
| 2009/0185479 A1* | 7/2009 | Hart et al. | 370/218 |
| 2009/0224966 A1* | 9/2009 | Boling et al. | 342/357.1 |
| 2010/0003958 A1* | 1/2010 | Ray et al. | 455/404.2 |
| 2010/0029243 A1* | 2/2010 | Ozer et al. | 455/404.1 |
| 2010/0093304 A1* | 4/2010 | Miyoshi et al. | 455/404.1 |
| 2011/0026452 A1* | 2/2011 | Kang et al. | 370/315 |
| 2013/0021924 A1* | 1/2013 | Ericson et al. | 370/252 |

* cited by examiner

*Primary Examiner* — Barry Taylor
(74) *Attorney, Agent, or Firm* — Sterne, Kessler, Goldstein & Fox PLLC (57) ABSTRACT

A wireless communication device is disclosed that is capable of transmitting emergency data to a base station even when the wireless communication device is out of range, or has insufficient battery life, to communicate with the base station using normal transmission means. When the wireless communication device is out of range or has low battery, the wireless communication device can transmit the emergency data to the base station by repeatedly transmitting the emergency data at a coding rate below a standard/minimum coding rate of the modulation scheme designated for use by the base station. The second wireless communication device can detect and decode the emergency data by storing the multiple transmitted iterations of the received signal and performing combining processing on those stored iterations.

21 Claims, 7 Drawing Sheets

WIRELESS COMMUNICATION DEVICE AND METHOD FOR TRANSMITTING EMERGENCY DATA FROM OUTSIDE A COVERAGE ZONE

CROSS-REFERENCE TO RELATED APPLICATIONS

This patent application claims the benefit of U.S. Provisional Patent Application No. 61/527,301, filed Aug. 25, 2011, entitled "Wireless Communication Device Capable of Transmitting Emergency Signal From Outside Coverage Zone," which is incorporated herein by reference in its entirety.

BACKGROUND

1. Field of Invention

The invention relates to wireless communications, and more specifically to a wireless communication device that is capable of transmitting emergency signals to a wireless receiver even when the wireless communication device is outside of a coverage zone of the wireless receiver.

2. Related Art

Wireless communication devices, such as cellular telephones to provide an example, are becoming commonplace in both personal and commercial settings. The wireless communication devices provide users with access to all kinds of information. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency modulated with encoded information. This radio frequency is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including amplitude modulation (AM), frequency modulation (FM), quadrature amplitude modulation (QAM), phase shift keying (PSK), quadrature phase shift keying (QPSK), and/or orthogonal frequency-division multiplexing, as well as any other communication scheme that is now, or will be, known.

Typical modulation schemes also include a standard or minimum coding rate used for forward error correction (FEC). The coding rate defines the number of redundant error-check bits used for each bit of non-redundant information. FEC increases the probability that transmitted information will be successfully received (error free). Low coding rates provide a greater likelihood of successful transmission, but require more energy to transmit the encoded information due to the larger number of bits associated with the information. Conversely, higher coding rates require less energy, but decrease the likelihood of successful transmission due to a smaller number of error-check bits.

Regardless of the coding rate employed, the ability of the wireless communication device to successfully transmit/receive data is typically limited by the range of coverage of the wireless access points. For example, a wireless network, such as a cellular network to provide an example, contains a plurality of access points in the form of base stations that each define a coverage cell. Each cell defines the coverage zone for a corresponding base station, and is based on a modulation scheme used in the wireless network and the modulation scheme's corresponding standard/minimum coding rate. Wireless communication devices within the cell communicate with the base station to send and receive data. If the wireless communication device moves from one cell to another, various methods exist to pass communication responsibilities from the base station of the original cell to a base station associated with the new cell. However, if the wireless communication device exits the coverage zone (i.e., is not within any cell), the wireless communication device will be incapable of sending/receiving data using the modulation scheme and standard/minimum coding rate designated for use within the wireless network. Consequently, the wireless communication device "loses service" and the ability to communicate with the cellular network.

Loss of service typically occurs in rural areas due to lack of cellular towers (base stations), and within certain structures due to high path loss, noise, or interference. Although this loss of service often amounts to a mere nuisance, the inability to communicate with the network can prove life-threatening in emergency situations because a user will be unable to request assistance or even notify emergency services of his location. A similar danger may arise when a power supply (i.e., a battery) of the wireless communication device has insufficient power to operate the device in a normal condition, or to modulate and encode the necessary data using the designated modulation scheme and coding rate.

Thus, there is a need for a wireless communication device that can effectively communicate emergency data to a wireless access point even when the wireless communication device is outside of the wireless network or lacks sufficient battery power to communicate with the network using the designated modulation and coding scheme. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication (specifically cellular communication), those skilled in the relevant art(s) will recognize that the present invention may be applicable to other communications that use wired or other wireless communication methods without departing from the spirit and scope of the present invention.

An Exemplary Wireless Communications Environment

Figure 1:
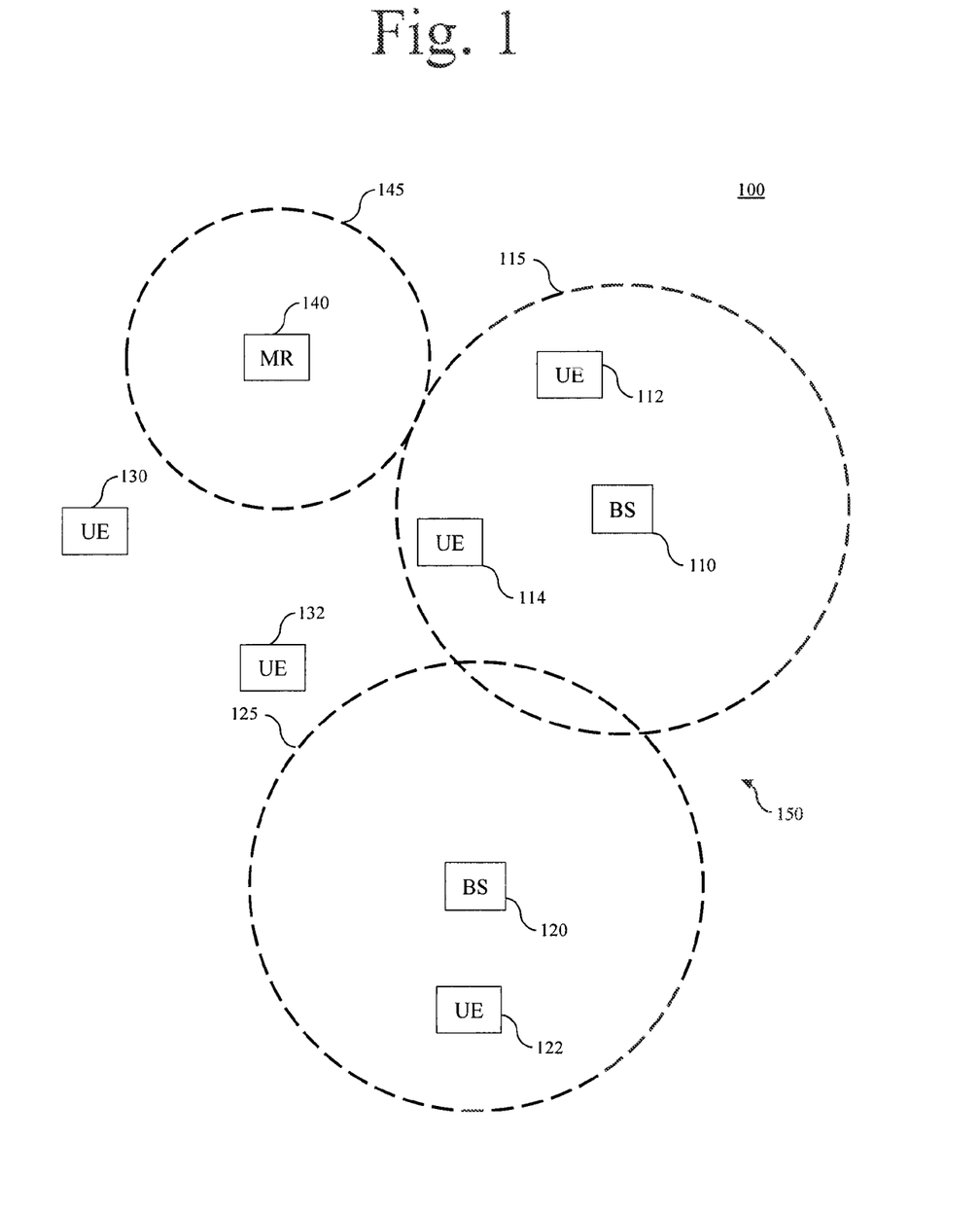
FIG. 1 illustrates a block diagram of a wireless communication environment according to an exemplary embodiment of the invention.

FIG. 1 illustrates a block diagram of a wireless communication environment 100 according to an exemplary embodiment of the invention. The wireless communication environment 100 provides wireless communication of information, such as one or more commands and/or data, among mobile subscribers MS and wireless access points (base stations BS or mobile receivers MR) that are sufficiently proximate to each other. The mobile subscribers MS and mobile receiver MR may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the invention.

The exemplary wireless communication environment 100 includes a plurality of base stations for providing wireless coverage to a plurality of wireless-enabled mobile subscribers. For example, base station 110 defines a wireless coverage cell 115 for providing wireless connectivity to mobile subscribers contained therein (e.g., mobile subscriber 112 and mobile subscriber 114). Similarly, base station 120 defines a wireless coverage cell 125 for providing wireless connectivity to mobile subscribers contained therein (e.g., mobile subscriber 122). The combined cells of the wireless communication environment 100 define a wireless network 150. Being within the wireless network 150 allows wireless-enable devices to connect and transfer information, whereas wireless-enabled devices located outside the wireless network 150 will be unable to do so.

The wireless communication environment 100 can also include a mobile receiver 140. Unlike a stationary base station, the mobile receiver 140 is movable and can scan out-of-network areas for wireless transmissions. The mobile receiver 140 can be a handheld device carried by a user or can be fixed to a vehicle, such as an automobile, helicopter, all-terrain vehicle (ATV) or boat. The mobile receiver 140 can be a standalone device, or coupled to or incorporated within another suitable electronic device. The mobile receiver 140 may define a detection area 145 in which wireless-enabled devices may be detectable.

The wireless communication environment 100 may also include mobile subscribers located outside of the wireless network 150. For example, mobile subscriber 130 and mobile subscriber 132 are not located in any cells. Consequently, mobile subscriber 130 and mobile subscriber 132 are outside of the wireless network 150 and will be unable to communicate with the cellular network using conventional communication methods.

Figure 2:
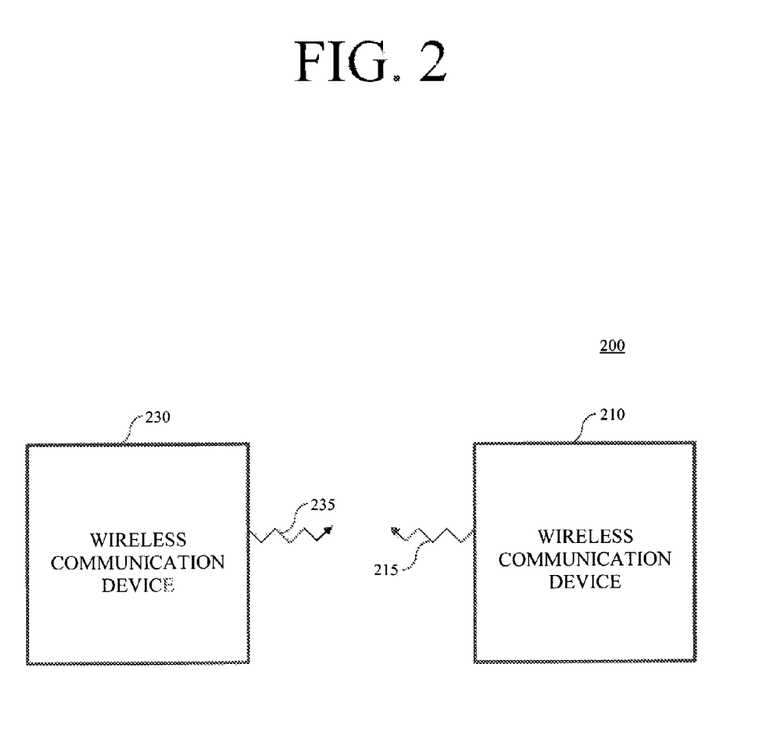
FIG. 2 illustrates a block diagram of a pair of wireless communication devices that is implemented as part of the wireless communication environment according to an exemplary embodiment of the invention.

FIG. 2 illustrates a block diagram of a pair of wireless communication devices 200 that is implemented as part of the wireless communication environment 100 according to an exemplary embodiment of the invention. The pair 200 includes a first wireless communication device 230 and a second wireless communication device 210. The first wireless communication device 230 may represent an exemplary embodiment of a mobile subscriber and the second wireless communication device 210 may represent an exemplary embodiment of a base station or a mobile receiver.

The first wireless communication device 230 transmits a first wireless signal 235 toward the second wireless communication device 210 using any acceptable modulation scheme along with a corresponding standard/minimum coding rate designated for use within the wireless network 150. The second wireless communication device 210 receives the first wireless signal 235. The second wireless communication device 210 processes the received first communication signal and, if necessary, transmits a second wireless signal 215 back to the first wireless communication device 230.

The signal strength of the first wireless signal 235 deteriorates as the distance between the first wireless communication device 230 and the second wireless communication device 210 increases. The reduced signal strength results from reduced power of the received signal, as well as increased noise and interference. The distance between the devices similarly affects the signal strength of the second wireless signal 215. Thus, a coverage cell associated with the second wireless communication device 210 defines a maximum distance that will allow for communications between the first and second wireless communication devices using the designated modulation and coding scheme. Consequently, once the first wireless communication device 230 moves outside of the cell, it will lose connectivity, and will be unable to successfully send or receive data in accordance with the designated modulation scheme/coding rate. In other words, the first wireless communication device 230 will "lose service."

A First Exemplary Wireless Communication Device

Figure 3:
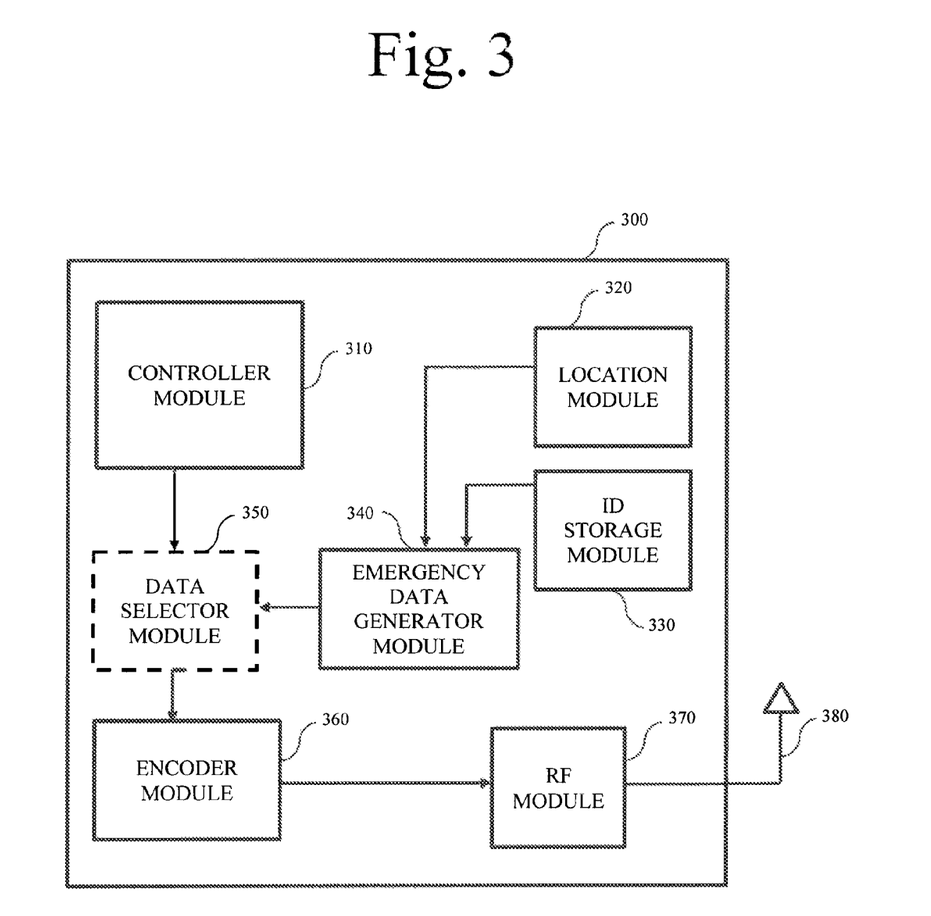
FIG. 3 illustrates a block diagram of a first wireless communication device that is implemented as part of the pair of wireless communication devices according to an exemplary embodiment of the invention.

FIG. 3 illustrates a block diagram of a first wireless communication device 300 that is implemented as part of the pair of wireless communication devices 200 according to an exemplary embodiment of the invention. The first wireless communication device 300 may represent an exemplary embodiment of the first wireless communication device 230, and includes an emergency data generator module 340. For simplification, several aspects unrelated to the transmission of emergency data are omitted from the description of the first wireless communication device 300.

The first wireless communication device 300 includes a controller module 310 that performs many of the operations of the first wireless communication device 300. The controller module 310 can also generate data based on user operations of the first wireless communication device 300. The first wireless communication device 300 also includes a location module 320, an ID storage module 330, and an emergency data generator module 340. The location module 320 tracks a location of the first wireless communication device 300. For example, the location module 320 can be a Global Positioning System (GPS) unit that determines a position of the first wireless communication device 300 through a link to orbiting GPS satellites, and stores the location as GPS coordinates, or other location coordinates. The ID storage module 330 stores a device ID of the first wireless communication device 300. The device ID may be a character string from a SIM card or a MAC address, or some other means of representing owner information of the wireless device.

The first wireless communication device 300 may operate in a non-emergency mode or an emergency mode. The emergency mode may be initiated and/or canceled based on a user operation of the device, such as by the user depressing one or a combination of buttons on the device.

1. Non-Emergency Mode

In the non-emergency mode, the controller module 310 forwards data (e.g. voice data) to an encoder module 360 through an optional data selector module 350 (discussed below). The encoder module 360 encodes the generated data using the standard/minimum coding rate associated with the designated modulation scheme of the wireless network 150. The encoder module 360 then forwards the encoded data to the RF module 370.

In the non-emergency mode, the RF module 370 modulates the encoded data using the designated modulation scheme and forwards the encoded modulated data to an antenna 380. The antenna 380 transmits the modulated information signal into the wireless communication environment 100 to be received by another wireless communication device, such as a base station or a mobile receiver.

In the non-emergency mode, the emergency data generator module 340 remains in an idle state. The controller module 310 continues to generate data for transmission based on user instructions depending on various environmental and device factors, such as whether the first wireless communication device 300 is within the wireless network 150 or whether there is sufficient remaining battery life to support communication. For example, the first wireless communication device 300 may generate and transmit information signals in the non-emergency mode in accordance with Table 1.
transmit information signals in the non-emergency mode in accordance with Table 1.

TABLE 1

| Non-Emergency Mode Signal Transmission | | |
|---|---|---|
| Battery Level | Cellular Service | Transmit Signals |
| HIGH | YES | YES |
| HIGH | NO | NO |
| LOW | YES | NO |
| LOW | NO | NO |

Those skilled in the art will recognize that other transmission configurations may desired based on use and application of a particular wireless-enable device within the spirit and scope of the invention.

2. Emergency Mode

In the emergency mode, the emergency data generator module 340 acquires a location of the first wireless communication device 300 from the location module, and acquires the device ID from the ID storage module 330. The emergency data generator module 340 then generates emergency data that includes the acquired location and device ID. In order to minimize transmission power requirements, the emergency data is preferably very short to reduce its number of bits. Preferably, the emergency data includes only a predetermined number of bits identifying the data as "emergency data," the acquired location and the acquired device ID. The emergency data generator module 340 then transmits the generated emergency data to the encoder module 360 through the data selector data selector module 350.

The data selector module 350 can act as a signal injector between the non-emergency data received from the controller module 310 and the emergency data received from the emergency data generator module 340. In the non-emergency mode, the emergency data generator module 340 preferably does not generate data. Thus, the data selector 350 allows the data received from the controller module 310 to pass to the encoder module 360 unaltered. However, in the emergency mode, the data selector module 350 injects the emergency data into a transmission path for the encoder module 360 regardless of whether non-emergency data is also traveling in the transmission path. As discussed in further detail below, the controller module 310 may cease generating non-emergency data under certain circumstances to allow the emergency data alone to travel to the encoder module 360. Those skilled in the art will recognize that the data selector module 350 can be a switch, a modulator, a summer, or any other suitable device for transmitting one or both of the emergency data and the non-emergency data within the spirit and scope of the invention.

The data selector module 350 then transmits the selected data to the encoder module 360. The encoder module 360 encodes the selected data and forwards the encoded data to the RF module 370. The RF module 370 modulates the encoded data and forwards the encoded modulated data to the antenna 380 for transmission. The antenna 380 transmits the encoded modulated data into the wireless communication environment 100 to be received by another wireless communication device.

In the emergency mode, the various modules of the device 300 may be configured to perform different functions depending on the circumstances. For example, provided that the first wireless communication device 300 is within the wireless network 150 and has sufficient battery to operate in a normal condition, the first wireless communication device 300 transmits the emergency data using the designated modulation scheme and its corresponding standard/minimum coding rate in order to ensure an immediate successful transmission. However, if the first wireless communication device 300 has a low battery, the first wireless communication device 300 may have insufficient power to transmit the emergency data using the designated modulation scheme and its standard/minimum coding rate. In addition, if the first wireless communication device 300 is outside the wireless network 150, it may be detrimental to transmit the emergency data using the selected modulation scheme and its standard/minimum coding rate for risk of depleting the battery, and the small likelihood of successfully transmission.

In order to conserve power under low-battery or no-service circumstances, the controller module 310 preferably stops attempting to transmit data. In addition, the encoder module 360 preferably encodes the emergency data using a reduced coding rate that is below the specified standard/minimum coding rate of the designated modulation scheme for normal network service. Under the circumstances, the emergency data received by a base station may not be detectable in a single transmission because the first wireless communication device 300 may be without normal cellular network service. Thus, the RF module 370 preferably automatically repeats transmission of the encoded emergency data. By repeatedly transmitting the encoded emergency data, the receiving device will be able to reconstruct the emergency data over time, as discussed in detail below. Therefore, the first wireless communication device 300 could be configured to operate in accordance with Table 2 while in the emergency mode.

TABLE 2

Emergency Mode Device Operation Based on Battery Level and Service

| Battery Level | Cellular Service | Normal Condition | Transmit Non-emergency Data | Emergency Data Encoding Rate |
|---|---|---|---|---|
| HIGH | YES | YES | YES | Standard/Minimum |
| HIGH | NO | NO | NO | Reduced |
| LOW | YES | NO | NO | Reduced |
| LOW | NO | NO | NO | Reduced |

Those skilled in the art will recognize that other transmission configurations may desired based on use and application of a particular wireless-enable device within the spirit and scope of the invention.

When the first wireless communication device 300 is without normal network service or low on battery power, it will be unable to communicate with a base station in order to negotiate a transmission channel (e.g. time, and/or frequency) for the emergency data. Thus, in one embodiment, the first wireless communication device 300 should transmit the emergency data on the last known usable frequency, unless the device is aware of a designated emergency frequency, as discussed below.

An Exemplary Communication Sub-Frame

Figure 4:
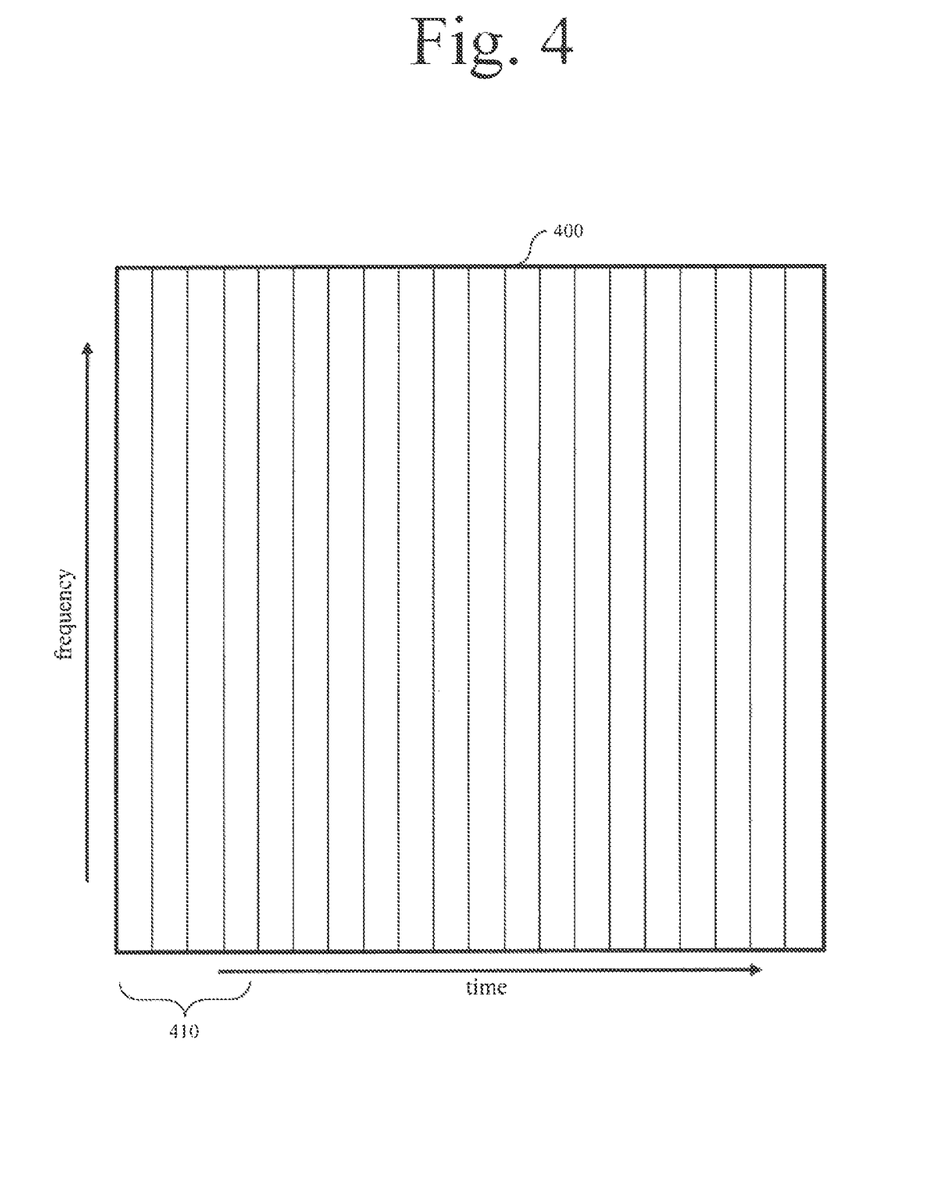
FIG. 4 graphically illustrates a communication sub-frame in accordance with a modulation scheme that may be implemented by the first wireless communication device according to an exemplary embodiment of the invention.

FIG. 4 graphically illustrates a communication sub-frame 400 in accordance with a modulation scheme that may be implemented as part of the first wireless communication device 300, according to an exemplary embodiment of the invention. The communication sub-frame 400 includes a plurality of carrier frequencies each capable of carrying data to another wireless communication device. For example, in OFDM, data symbols are compiled into such a communication sub-frame using a plurality of orthogonal carrier frequencies, such that each carrier wave can be independently detected and demodulated.

The communication sub-frame 400 includes n+1 carrier frequencies, and includes at least one carrier frequency $f_c(e)$ that is designated as an emergency frequency. The emergency frequency $f_c(e)$ may be reserved entirely for emergency data, such that standard communication signals are restricted from be placed on the emergency frequency $J_c(e)$. However, restricting non-emergency data from the emergency frequency $f_c(e)$ consumes precious bandwidth. Therefore, as an alternative, the emergency frequency $f_c(e)$ may instead be configured to allow non-emergency data to be transmitted thereon. For example, base stations typically reserve one or more carrier frequencies as Physical Random Access Channels (PRACH) for negotiating communication parameters with devices making an initial attempt to connect with the base station. Thus, one of the PRACH resources could be also designated for both emergency data and PRACH. This is effective because base stations constantly monitor PRACH for new users attempting to initiate connection to the network, so it would be convenient to monitor for encoded modulated emergency data as well.

Provided that the first wireless communication device 300 has knowledge of the emergency frequency $f_c(e)$, it could transmit emergency data on the designated emergency frequency $f_c(e)$ rather than on its last-used frequency. The base station could then be configured to monitor only/primarily the emergency frequency $f_c(e)$ for any emergency data, as discussed below with respect to the wireless communication device of FIG. 5.

A Second Exemplary Wireless Communication Device

Figure 5:
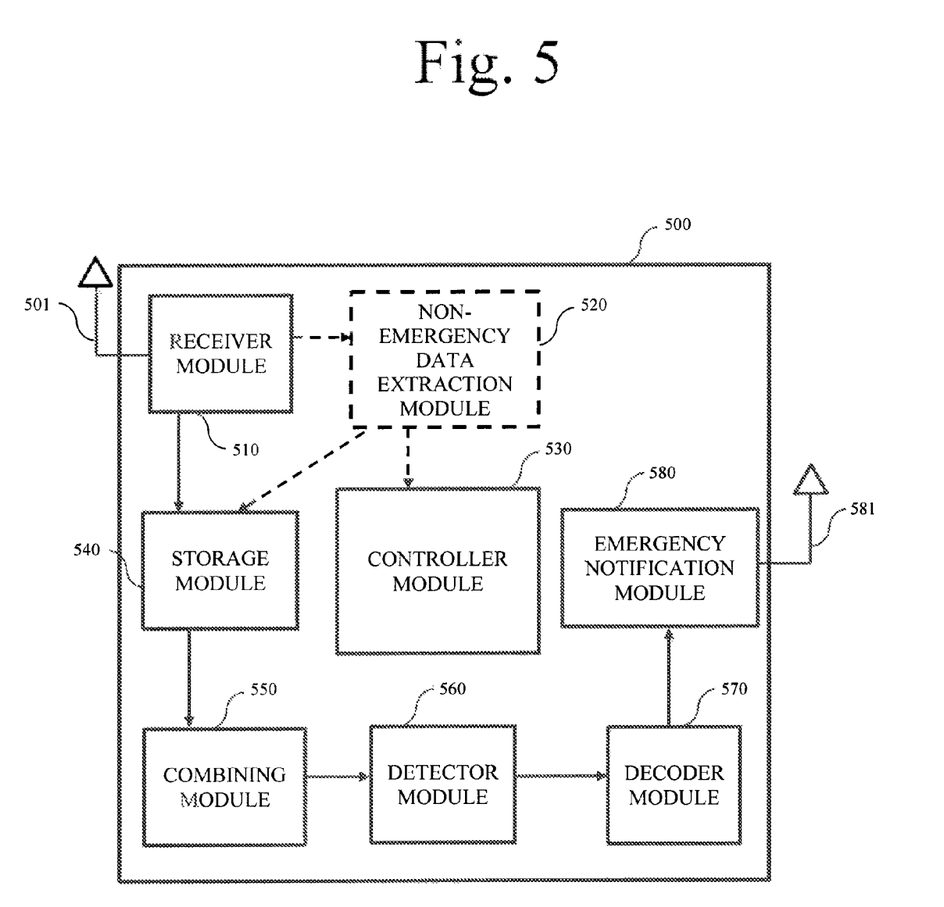
FIG. 5 illustrates a block diagram of a second wireless communication device that is implemented as part of the pair of wireless communication devices according to an exemplary embodiment of the invention.

FIG. 5 illustrates a block diagram of a second wireless communication device 500 that is implemented as part of the pair of wireless communication devices 200 according to an exemplary embodiment of the invention. The second wireless communication device 500 includes a storage module 540, a combining module 550 and a detector module 560, and may represent a second wireless communication device 210 according to an exemplary embodiment. For example, the second wireless device may be a cellular base station, or mobile wireless receiver that is used by emergency personal. For simplification, several aspects unrelated to the extraction of the emergency data are omitted from the description of the second wireless communication device 500.

The second wireless communication device 500 receives an incoming signal from the wireless communication environment 100 at its antenna 501 in the form of a communication sub-frame. The antenna 501 forwards the received signals to a receiver module 510. If the emergency frequency $f_c(e)$ is restricted to emergency data only, the receiver module 510 forwards the signal contained on the emergency carrier frequency $f_c(e)$ directly to the storage module 540. Alternatively, if the emergency frequency $f_c(e)$ also allows for transmission of non-emergency data, the receiver module 510 forwards the received signal contained on the carrier frequency $f_c(e)$ to a non-emergency data extraction module 520. The non-emergency data extraction module 520 extracts the non-emergency data from the signal and forwards the extracted data to a controller module 530 for further processing, leaving a residual signal. In one embodiment, the non-emergency data extraction module 520 consists of a decision feedback equalizer circuit. The non-emergency data extraction module 520 forwards the residual signal to the storage module 540.

In order to perform the combining processing, the storage module 540 stores the received/residual signal along with a predetermined number of previous and/or future emergency frequency/residual signals. The storage module 540 can be any volatile or non-volatile memory. The combining module 550 accesses the storage module 540 and performs combining processing on the stored signals using any known combining process, such as Chase combining, Transmit Time Interval (TTI) bundling, or fountain decoding. For example, using Chase combining, the combining module 550 effectively adds each of the stored signal iterations together. The random Gaussian noise included in each stored signal will add non-coherently, such that the power of the Gaussian noise of the combined signal will not increase. Conversely, the low-power emergency data contained among the stored signals will add coherently, thereby increasing the power of the emergency data to a detectable level. For example, using a combining process will cause a power of the emergency data to increase approximately in accordance with the following equation:

$$10*\log(I) = \text{Gain (dB)}, \quad (1)$$

where I is the number of combined signal iterations. Thus, combining 1000 signals that each include the emergency data will result in $10*\log(1000)=30$ dB gain. Consequently, the second wireless communication device 500 will detect emergency data sent from devices outside the wireless network 150 and/or using a low coding rate, once a sufficient number of the repeated encoded modulated emergency data are processed together.

After performing the combining process, the combining module 550 forwards the combined signal to the detector module 560. The detector module 560 makes a determination as to whether the combined signal includes the emergency data. As discussed above, noise components of the stored signals will combine non-coherently, and therefore should not substantially increase in power. Therefore, in one embodiment, the detector module 560 can determine whether the combined signal includes an emergency data merely by comparing a power of the combined signal to a predetermined threshold.

If the detector module 560 detects the presence of the emergency data, the detector module 560 forwards the detected emergency data to the decoder module 570. The decoder module 570 extracts the emergency data using the designated modulation scheme and decodes the demodulated emergency data using either the standard/minimum coding rate or the reduced coding rate, depending on the coding rate used to encode the emergency data. The decoder module 570 forwards the decoded emergency data to an emergency notification module 580.

The emergency notification module 580 determines the device ID and location contained within the decoded emergency data and generates an emergency notification that includes the device ID and location of the originating wireless communication device of the emergency data for forwarding to an emergency service provider. The emergency notification module 580 forwards the emergency notification to a communication link 581 for transmission to an emergency service center, such as a nearby police station, 9-1-1 call service center, park ranger office, or other public service office for emergency response. The communication link 581 can be either a hard-wired communication link or a wireless communication link, and may transmit the emergency data on a designated emergency frequency/channel or on a public frequency/channel. In an embodiment, the emergency notification module 580 can also generate and transmit a response signal to the device that transmitted the emergency data.

Because pre-demodulation combining has been shown to have improved gain over post-demodulation (bit level) combining, the second wireless communication device 500 has been described as performing pre-demodulation combining. However, those skilled in the relevant art(s) will recognize that, depending on the desired application, the second wireless communication device could instead be configured to perform post-demodulation (bit level) combining.

Those skilled in the relevant art(s) will recognize that several other configurations can be implemented in the second wireless communication device 500 based on its application. For example, instead of having an entire frequency resource being designed for both PRACH and emergency service in a continuous manner as discussed above, the second wireless communication device 500 can instead operate according to a time-multiplexed configuration for the frequency resource. Specifically, first timeslots associated with the frequency resource are allocated for PRACH, and second time slots are allocated for emergency data. Further, if the second wireless communication device 500 detects the presence of an emergency data on the designated frequency resource, then the second wireless communication device 500 can fully restrict the emergency frequency to emergency data only. This allows the second wireless communication device 500 to dynamically modify signal permissions to maximize bandwidth, while also increasing its ability to receive emergency data. In addition, in the event that the second wireless communication device 500 is another mobile subscriber, upon detection of emergency data, the second wireless communication device 500 could be configured to retransmit the received emergency data. This will allow for the emergency data to be "relayed" from one mobile station to another towards a base station, which can significantly increase its received power and transmission distance, as well as its likelihood of successful transmission.

An Exemplary Method of Transmitting Emergency Data

Figure 6:
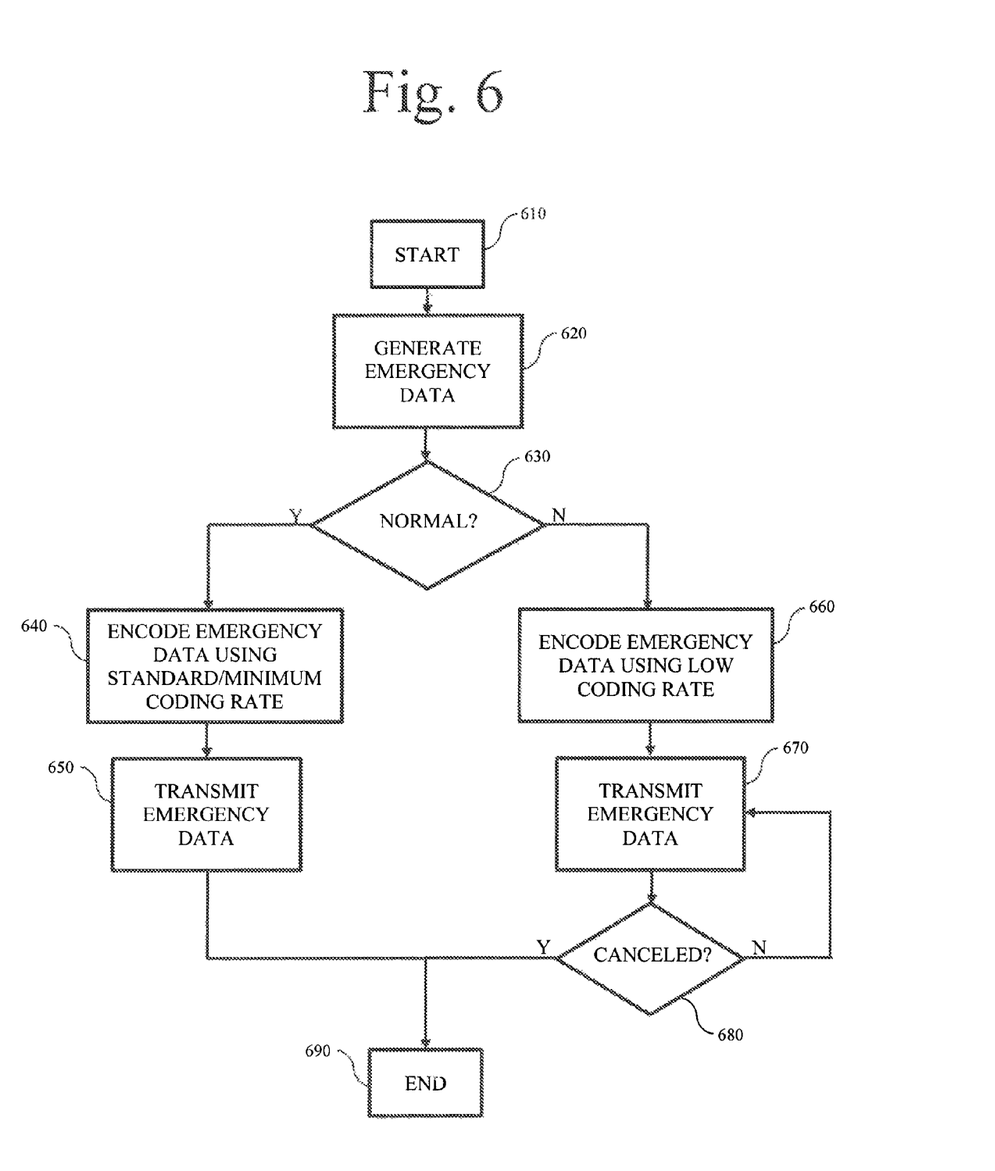
FIG. 6 illustrates a block diagram of a method for transmitting emergency data in a wireless communication device according to an exemplary embodiment of the invention.

FIG. 6 illustrates a block diagram of a method for transmitting emergency data in a wireless communication device according to an exemplary embodiment of the invention.

The method begins at step 610 and immediately proceeds to step 620. In step 620, emergency data is generated that includes a device ID of the wireless communication device and a location of the wireless communication device. The location may be in the form of GPS coordinates. The method then proceeds to step 630. In step 630, a determination is made as to whether the device is in a normal operating condition. For example, the device could be in a normal operating condition if the device has service and sufficient battery power for normal network operation. Alternatively, if it is determined that a battery of the device is low or that the device is not receiving network service, it is determined that the device is not in a normal operating condition.

If the device is determined to be in a normal operating condition, the method proceeds to step 640. In step 640, the emergency data is encoded using the standard/minimum coding rate of a designated modulation scheme, and is also modulated in accordance with the designated modulation scheme. The method then proceeds to step 650. In step 650 the modulated encoded emergency data is transmitted into the wireless communication environment to be received by another wireless communication device. The method then proceeds to step 690, where the method ends.

Alternatively, if it is determined in step 630 that the device is not is a normal operating condition, the method proceeds to step 660. In step 660, the generated emergency data is encoded using a coding rate lower than the standard/minimum coding rate, and is modulated based on the designated modulation scheme. The method then proceeds to step 670. In step 670, the modulated encoded emergency data is transmitted to the wireless communication environment for receipt by another wireless communication device. The method then proceeds to step 680.

In step 680, a determination is made as to whether the emergency mode has been canceled. If the emergency mode has not been canceled, the method returns to step 670 for retransmission. In this manner, the transmission of the emergency data is repeated until the emergency mode is canceled. If it is determined at step 680 that the emergency mode has been canceled, the method proceeds to step 690. In step 690, the method ends.

Those skilled in the relevant art(s) will recognize that the method can additionally or alternatively include any of the functionality of the first wireless communication device 300 discussed above, and the above description of the exemplary method should neither be construed to limit the method nor the description of the first wireless communication device 300.

An Exemplary Method of Transmitting Emergency Data

Figure 7:
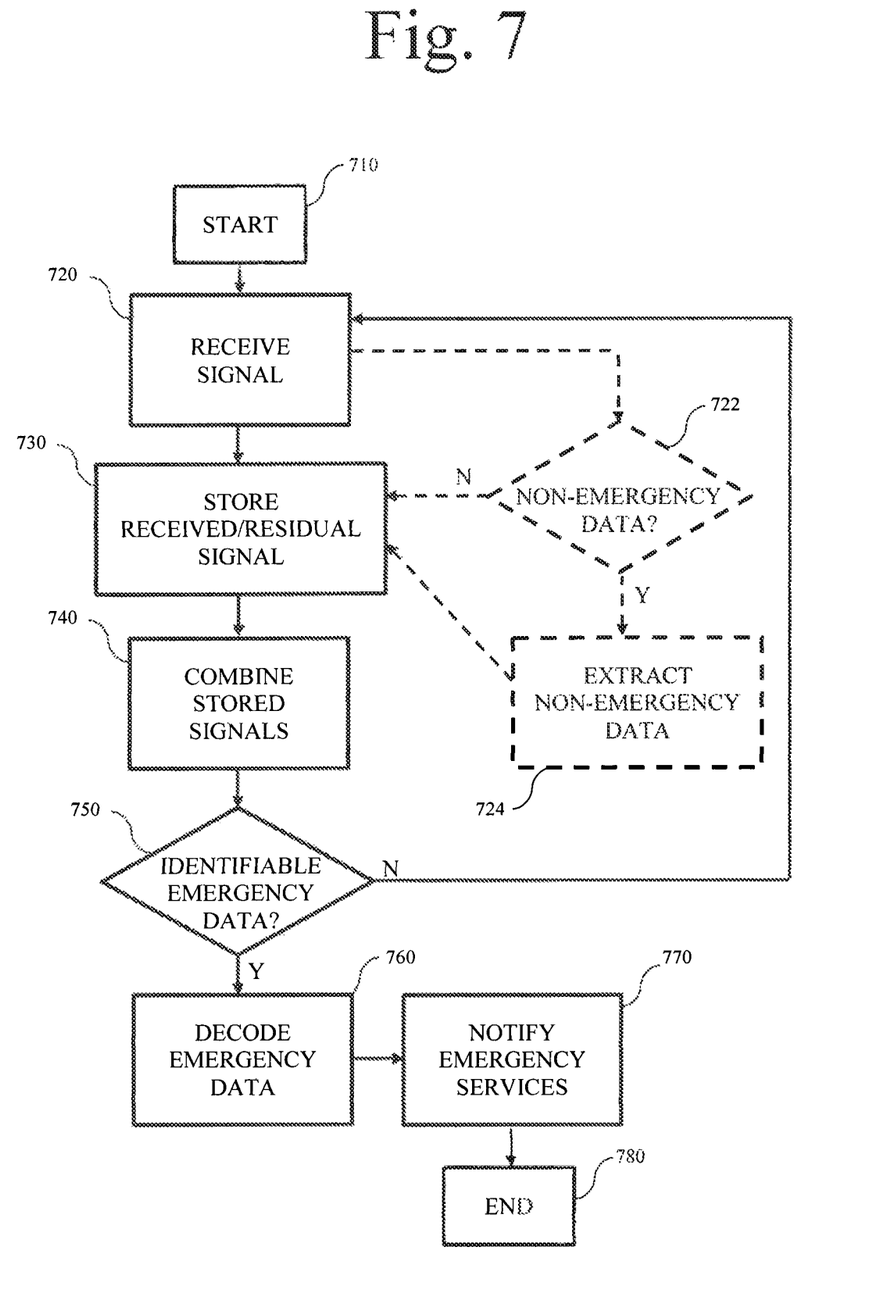
FIG. 7 illustrates a block diagram of a method for detecting an emergency signal in a wireless communication device according to an exemplary embodiment of the invention.

FIG. 7 illustrates a block diagram of a method for detecting an emergency data in a wireless communication device according to an exemplary embodiment of the invention.

The method begins at step 710 and immediately proceeds to step 720. At step 720, a signal is received. As discussed above with respect to the communication sub-frame 400, emergency data may be received on an emergency carrier frequency Jae). The emergency earlier frequency $f_c(e)$ may be designated for emergency use only, or may also include non-emergency data to utilize full bandwidth potential of the transmission medium. If the emergency carrier frequency $f_c(e)$ includes only emergency data, then the method proceeds directly to step 730. Alternatively, if the emergency carrier frequency $f_c(e)$ can additionally include non-emergency data, the method proceeds to step 722.

In step 722, the received signal is analyzed to determine whether a non-emergency data is present. If it is determined that no non-emergency data is present, the method proceeds to step 730. Alternatively, if it is determined that non-emergency data is present in the received signal, the method proceeds to step 724. In step 724, the non-emergency is extracted, leaving a residual signal. The method then proceeds to step 730.

In step 730, the received/residual signal is stored along with a predetermined number of previous and/or future received/residual signals. The method then proceeds to step 740. In step 740, combination processing is performed on the stored signals. The combining processing can include any known combining process, such as Chase combining, TTI bundling or fountain codes, as discussed above. The method then proceeds to step 750.

In step 750, a determination is made regarding whether the combined signal includes the emergency data. In one embodiment, the determination can be performed by comparing a power of the combined signal to a predetermined threshold. If no emergency data is detected, the method returns to step 720. In this manner, the method repeats the process of obtaining and combining received signals to extract emergency data. Alternatively, if emergency data is detected, the method proceeds to step 760.

In step 760, the emergency encoded modulated data is demodulated using the designated modulation scheme, and decoded using a coding rate based on the coding rate of the emergency data. The method then proceeds to step 770. In step 770, an emergency service center, such as a nearby police station, 9-1-1 call service center, park services, or other public service office is notified of the received emergency data in order to perform emergency response. The notification should include the device ID and location contained within the decoded emergency signal. The method then proceeds to step 780. In step 780, the method ends.

Those skilled in the relevant art(s) will recognize that the method can additionally or alternatively include any of the functionality of the first wireless communication device 500 discussed above, and the above description of the exemplary method should neither be construed to limit the method nor the description of the first wireless communication device 500.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A wireless communication device, comprising:
a controller module configured to determine whether a normal operation mode is available;
an emergency data generation module configured to generate emergency data, the emergency data including a device identifier;
an encoder module configured to encode the emergency data at a forward error correction (FEC) coding rate that is less than a minimum FEC coding rate defined for normal transmission in the normal operation mode when the normal operation mode is unavailable; and
a transmission module configured to transmit the encoded emergency data.

2. The wireless communication device of claim 1, farther comprising:
a location module configured to detect a location of the device,
wherein the emergency data generated by the emergency data generation module includes the detected location.

3. The wireless communication device of claim 1, wherein, when the controller module determines that the normal operation mode is available, the encoder module is configured to encode the emergency data at an FEC coding rate that is equal to or greater than the minimum FEC coding rate defined for normal transmission in the normal operation mode.

4. The wireless communication device of claim 1, wherein the transmission module transmits the encoded emergency data on a frequency that was last used by the wireless communication device.

5. The wireless communication device of claim 1, wherein the transmission module transmits the encoded emergency data on a designated emergency frequency.

6. A wireless communication device, comprising:
a receiver module configured to receive a plurality of signals;
a storage module configured to store the received plurality of signals;
a combining module configured to sum the stored plurality of signals into a combined signal;
a detector module configured to detect whether the combined signal includes emergency data; and
a decoder module configured to extract emergency data from the combined signal,
wherein the plurality of signals originated from a same sender device,
wherein the plurality of signals were the same at their respective times of transmission from the sender device,
wherein each of the stored plurality of signals and the combined signal have a same length, and
wherein the combining module is configured to sum the stored plurality of signals by adding each of the plurality of signals to each other in their entireties.

7. The wireless communication device of claim 6, wherein the extracted emergency data includes a sender device identification and a sender device location.

8. The wireless communication device of claim 7, further comprising an emergency notification module configured to automatically notify an emergency service of the detected emergency signal by forwarding an alert to the emergency service along with the sender device identification and sender device location.

9. The wireless communication device of claim 8, wherein the emergency notification module generates and transmits a response message to a device corresponding to the device identification.

10. The wireless communication device of claim 6, wherein the plurality of signals are received on a designated emergency frequency.

11. The wireless communication device of claim 6, at least one of the received plurality of signals including non-emergency data, the device further comprising a non-emergency data extraction module configured to extract the non-emergency data from the at least one of the received plurality of signals,
wherein the at least one of the received plurality of signals are stored in the storage module after their respective non-emergency data has been extracted.

12. The wireless communication device of claim 11, further comprising a bandwidth allocation module configured to allocate bandwidth to incoming signal types, wherein
the received plurality of signals are received on a designated emergency frequency, and
upon detection by the bandwidth allocation module of emergency data on the emergency frequency, the bandwidth detection module restricts future non-emergency data from being transmitted on the emergency frequency.

13. The wireless communication device of claim 6, wherein the detector module determines whether the combined signal includes emergency data by comparing a signal strength of the combined signal to a predetermined threshold.

14. The wireless communication device of claim 6, wherein the wireless communication device is portable.

15. The wireless communication device of claim 6, wherein the emergency data is received at a lower FEC coding rate than a minimum FEC coding rate of a normal operation mode, and
wherein the received emergency data can be extracted, despite being encoded at the lower FEC coding rate, partly due to repetition of the emergency data.

16. A wireless communication system, comprising:
a wireless transmitter, comprising:
a controller module configured to determine whether a normal operation mode is available;
an emergency data generation module configured to generate emergency data at a forward error correction (FEC) coding rate that is less than a minimum FEC coding rate defined for normal transmission in the normal operation mode when the normal operation mode is unavailable, the emergency data including a device identifier;
an encoder module configured to encode the emergency data; and
a transmission module configured to repeatedly transmit the encoded emergency signal; and
a wireless receiver, comprising:
a receiver module configured to receive a plurality of signals;
a storage module configured to store the received plurality of signals;
a combining module configured to combine the stored plurality of signals into a combined signal;
a detector module configured to detect whether the combined signal includes the emergency signal data; and a decoder module configured to extract the emergency data from combined signal.

17. The wireless communication system of claim 16, further comprising:
an intervening wireless transceiver configured to receive the emergency data transmitted by the wireless transmitter and transmit the received emergency data to the wireless receiver.

18. The wireless communication system of claim 16, wherein
the wireless receiver is a wireless base station with a predetermined communication range, and
the wireless transmitter is located outside of the predetermined communication range.

19. A wireless communication device, comprising:
a controller module configured to determine whether the wireless communication device is capable of operating in a normal operation mode;
an emergency data generation module configured to generate emergency data, the emergency data including a device identifier;
an encoder module configured to encode the emergency data at a first forward error correction (FEC) coding rate or a second FEC coding rate depending on the determination of the controller module; and
a transmission module configured to transmit the encoded emergency data,
wherein the first FEC coding rate is below a minimum FEC coding rate defined for the normal operation mode and the second FEC coding rate is equal to or above the minimum FEC coding rate defined for the normal operation mode.

20. The wireless communication device of claim 19, further comprising:
a power supply; and
a cellular service detector module configured to determine whether cellular service is available, wherein
the controller module determines whether the wireless communication device is capable of operating in the normal operation mode based on at least one of a status of the power supply and the determination of the cellular service detector module.

21. The wireless communication device of claim 19, wherein
when the controller module determines that the wireless communication device is capable of operating in the normal operation mode, the encoder encodes the emergency data as in the normal operation mode, and
when the controller module determines that the wireless communication device is not capable of operating in the normal operation mode, the encoder encodes the emergency data at a lower FEC coding rate than the minimum FEC coding rate of the normal operation mode.

* * * * *